United States Patent
Zhang et al.

(10) Patent No.: US 12,091,084 B2
(45) Date of Patent: Sep. 17, 2024

(54) SYSTEM AND METHOD OF PROVIDING EVASIVE STEERING ASSIST

(71) Applicant: Aptiv Technologies AG, Schaffhausen (CH)

(72) Inventors: Guoguang Zhang, Westfield, IN (US); Tanto Sugiarto, West Lafayette, IN (US); Walter K. Kosiak, Kokomo, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 152 days.

(21) Appl. No.: 17/730,598

(22) Filed: Apr. 27, 2022

(65) Prior Publication Data

US 2022/0348257 A1 Nov. 3, 2022

Related U.S. Application Data

(60) Provisional application No. 63/180,835, filed on Apr. 28, 2021.

(51) Int. Cl.
*B62D 15/02* (2006.01)
*B62D 6/00* (2006.01)

(52) U.S. Cl.
CPC ......... *B62D 15/0265* (2013.01); *B62D 6/003* (2013.01)

(58) Field of Classification Search
CPC .. B60W 30/09; B60W 10/20; B60W 2520/14; B60W 2540/18; B62D 15/0265; B62D 6/00; B62D 15/021; B62D 6/003; G01S 2013/9318; G05D 1/0214
See application file for complete search history.

(56) References Cited

U.S. PATENT DOCUMENTS

| 8,392,062 B2* | 3/2013 | Oechsle | B60R 21/0134 340/435 |
| 9,229,453 B1* | 1/2016 | Lee | B60W 30/12 |
| 10,501,116 B2* | 12/2019 | Mizoguchi | B62D 1/286 |

(Continued)

FOREIGN PATENT DOCUMENTS

| CN | 108688656 A | 10/2018 |
| CN | 111002979 A | 4/2020 |

(Continued)

OTHER PUBLICATIONS

"Non-Final Office Action Mailed on Nov. 16, 2023", 18 pages.

*Primary Examiner* — Carl C Staubach
(74) *Attorney, Agent, or Firm* — Billion & Armitage

(57) ABSTRACT

A method of providing evasive steering assist (ESA) includes storing yaw rate data related to a host vehicle, wherein yaw rate data includes a yaw rate stored at each time step from an initial time step [0] to a current time step [n]. The method further includes determining whether to initiate ESA, wherein in response to a determination to initiate ESA, the method includes calculating a current position, a current heading angle, a destination position, and a destination heading angle, wherein the stored yaw rate data is utilized to determine the current heading angle and the destination heading angle. The method further includes generating an evasive steering assist (ESA) output based on the current position, the current heading angle, the destination position, and the destination heading angle.

20 Claims, 4 Drawing Sheets

(56) References Cited

U.S. PATENT DOCUMENTS

| | | | |
|---|---|---|---|
| 10,556,621 B2* | 2/2020 | Oya | B62D 6/006 |
| 11,492,042 B2* | 11/2022 | Uchida | B60K 35/60 |
| 11,667,330 B2* | 6/2023 | Kosiak | B60W 30/095 |
| | | | 701/41 |
| 11,932,307 B2* | 3/2024 | Satoh | B62D 15/025 |
| 2001/0003436 A1* | 6/2001 | Yoshikawa | G08B 21/06 |
| | | | 340/439 |
| 2002/0059026 A1* | 5/2002 | Abe | G01C 21/26 |
| | | | 701/412 |
| 2010/0114431 A1* | 5/2010 | Switkes | B62D 6/006 |
| | | | 701/41 |
| 2012/0283912 A1* | 11/2012 | Lee | B62D 1/286 |
| | | | 701/41 |
| 2014/0032093 A1* | 1/2014 | Mills | B60W 10/18 |
| | | | 701/301 |
| 2015/0120137 A1* | 4/2015 | Zeng | B60R 21/0134 |
| | | | 701/41 |
| 2015/0232090 A1* | 8/2015 | Jeon | B60W 50/14 |
| | | | 701/1 |
| 2016/0280265 A1* | 9/2016 | Hass | B62D 15/0265 |
| 2018/0174459 A1* | 6/2018 | Oh | B60W 30/10 |
| 2018/0346027 A1* | 12/2018 | Fujii | B60K 35/28 |
| 2020/0086856 A1* | 3/2020 | Park | B60W 30/09 |
| 2020/0086919 A1* | 3/2020 | Riikonen | B60T 8/17558 |
| 2021/0146920 A1* | 5/2021 | Park | B60W 10/18 |
| 2022/0073064 A1* | 3/2022 | Park | B60W 10/18 |
| 2022/0144259 A1* | 5/2022 | Hiemer | B60W 30/09 |
| 2022/0204083 A1* | 6/2022 | Kim | B62D 15/0255 |
| 2022/0234595 A1* | 7/2022 | Abe | B60W 50/0205 |

FOREIGN PATENT DOCUMENTS

| | | |
|---|---|---|
| CN | 111634331 A | 9/2020 |
| DE | 102013216931 A1 | 2/2015 |
| JP | 2015074370 A | 4/2015 |

* cited by examiner

SYSTEM AND METHOD OF PROVIDING EVASIVE STEERING ASSIST

CROSS-REFERENCE TO RELATED APPLICATIONS

This application claims the benefit of U.S. Provisional Patent Application No. 63/180,835 filed Apr. 28, 2021, which is incorporated by reference herein in its entirety.

BACKGROUND

This disclosure is related generally to systems and methods of providing evasive steering assist and in particular to evasive steering assist without the presence of lane markers.

Evasive Steering Assist (ESA) amplifies steering maneuvers in the presence of imminent frontal collisions. For example, ESA may be initiated in response to a determination that a steering maneuver initiated by the driver is insufficient to avoid collision, wherein the ESA response may be in the form of additional steering torque in the direction of the driver input. The additional steering torque is overlaid on the driver-applied steering torque to evade the primary object. As a result, the host vehicle will move around the obstacle. Most ESA features utilize lane markers to determine the host vehicle's location, direction and/or motion. In situations in which lane markers are not present, ESA features cannot be initiated. It would be beneficial to provide ESA features capable of being implemented in situations in which lane markers are not present.

SUMMARY OF THE INVENTION

According to one aspect, a method of providing evasive steering assist (ESA) includes storing yaw rate data related to a host vehicle, wherein yaw rate data includes a yaw rate stored at each time step from an initial time step [0] to a current time step [n]. The method further includes determining whether to initiate ESA, wherein in response to a determination to initiate ESA, the method includes calculating a current position, a current heading angle, a destination position, and a destination heading angle, wherein the stored yaw rate data is utilized to determine the current heading angle and the destination heading angle. The method further includes generating an evasive steering assist (ESA) output based on the current position, the current heading angle, the destination position, and the destination heading angle.

According to another aspect, a system for providing evasive steering assist (ESA) to a host vehicle includes a first input for receiving yaw rate data and an output for communicating an ESA output. In addition, the system includes an evasive steering controller configured to store yaw rate data over a period of time, to initiate ESA based on one or more inputs. In response to a determination to initiate ESA, the evasive steering controller utilizes the stored yaw rate data to determine a current position and a current heading angle of the host vehicle, utilizes the stored yaw rate data to determine a destination heading angle, and utilizes the current position to determine a destination position, wherein based on the current position, the current heading angle, the destination position, and the destination heading angle the evasive steering controller generates an evasive steering assist (ESA) output.

DETAILED DESCRIPTION

Disclosed herein is a system and method of providing evasive steering assist (ESA). In particular, the ESA system includes a queue for storing yaw rates associated with the vehicle over a given time period. In some embodiments, the yaw rate queue is a recirculating queue in which new values replace the oldest value in the queue. The yaw rate queue can be utilized to determine the current heading angle and the destination heading angle, which are utilized in calculating the additional steering torque provided as part of the ESA operation.

Figure 1:
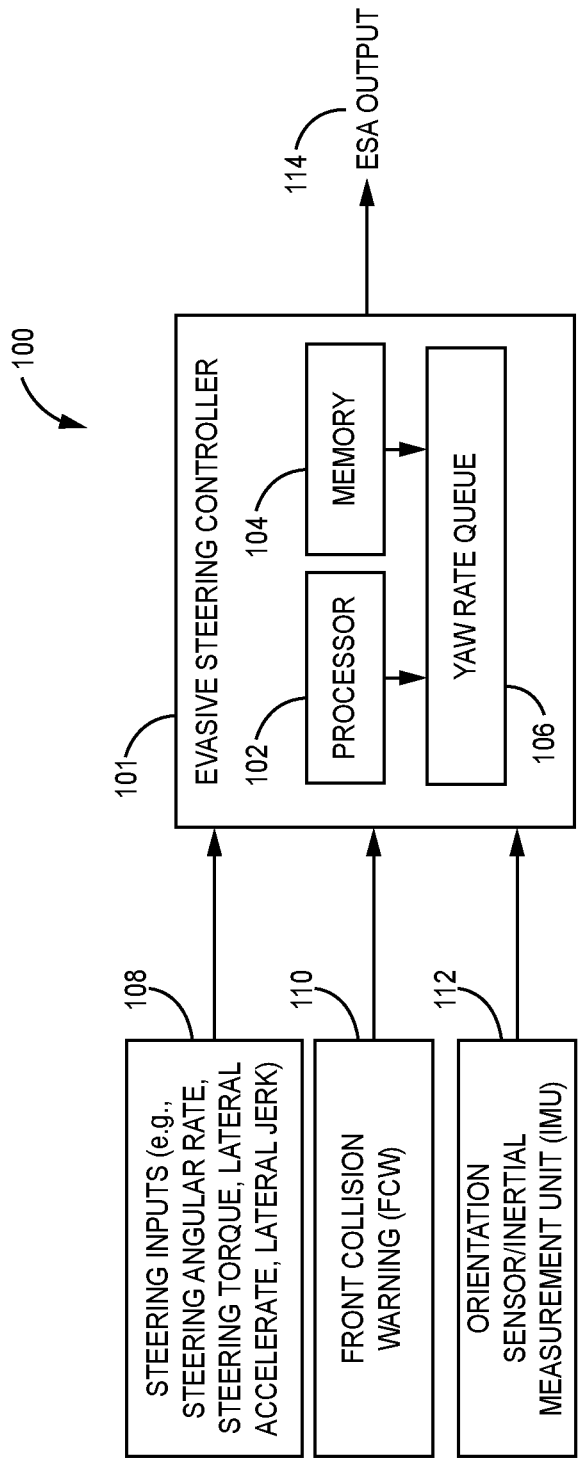
FIG. 1 is a block diagram of an evasive steering assist (ESA) system according to some embodiments.

FIG. 1 is a block diagram of an evasive steering assist (ESA) system 100 according to some embodiments. The ESA system 100 may include an evasive steering controller 101, which may include a processor 102 and memory 104. In some embodiments, the evasive steering controller 101 receives one or more inputs and in response to these inputs generates an ESA output 114. In some embodiments, the evasive steering controller is implemented in hardware, software, or a combination thereof. For example, processor 102 may be a microprocessor capable of executing instructions stored on memory 104 to implement the various functions. In other embodiments, processor 102 may be implemented as a programmable device such as a field programmable gate array (FPGA). Likewise, the yaw rate queue may be implemented in hardware, software, or a combination thereof. In some embodiments, the yaw rate queue 106 may be a recirculating queue in which the queue is fixed in length, with the oldest data being overwritten by the newest data. In other embodiments, other types of queues may be implemented by processor 102 and memory 104. In some embodiments, ESA system 100 utilizes inputs including steering inputs 108 (e.g., steering torque, steering angle rate, lateral jerk, and/or lateral acceleration), front collision warning (FCW) inputs 110, and yaw rate data 112 (for storage in yaw rate queue 106). As described in more detail below, steering inputs 108 are utilized to determine whether the driver has initiated evasive steering. In some embodiments, the steering input may be a binary input indicating whether evasive steering has been initiated by the driver (i.e., true or false). In other embodiments, steering inputs 108 may include raw data (e.g., steering torque, steering angle rate, lateral jerk, and/or lateral acceleration) that evasive steering controller 101 analyzes to detect an evasive steering event. In other embodiments, the steering input 108 may include information regarding a steering maneuver, including direction and magnitude of the steering maneuver, wherein evasive steering controller 101 utilizes the received input to determine whether the driver has initiated an evasive steering maneuver. In some embodiments, front collision warning input 110 is generated by a front collision detection system (not shown). The front collision detection system may use radar, laser (e.g., light detection and ranging or LiDAR systems), cameras, or a combination therefore to detect an imminent front collision. The FCW input 110 may be binary input indicating either the presence or absence of an imminent front collision, or may provide may specific information regarding the time to impact, distance to impact, size/shape of the object, etc. Evasive steering controller 101 may utilize the received data to determine whether the data is indicative of an imminent front collision.

As described in more detail below, in some embodiments the steering inputs 108 and FCW inputs 110 are utilized by the evasive steering controller 101 to detect an evasive maneuver. In response to a detected evasive maneuver and detected forward collision, ESA system 100 may generate an ESA output 114 that results in additional steering torque being overlaid on the driver applied steering torque to assist the driver in avoiding collision with the object.

In situations in which lane markers are not present to provide heading angle to the host vehicle, then the yaw rate queue 106 may be utilized to determine the heading angle (and position) of the host vehicle. Heading angle refers to the direction of travel of the host vehicle. Part of the evasive maneuver includes determining a desired position and heading angle of the host vehicle at the conclusion of the ESA action (for example, alongside the detected collision object and traveling approximately along the same heading as before). In some embodiments, the yaw rate data stored in the yaw rate queue 106 is utilized to make these determinations, as discussed in more detail with respect to FIGS. 3-6.

Figure 2:
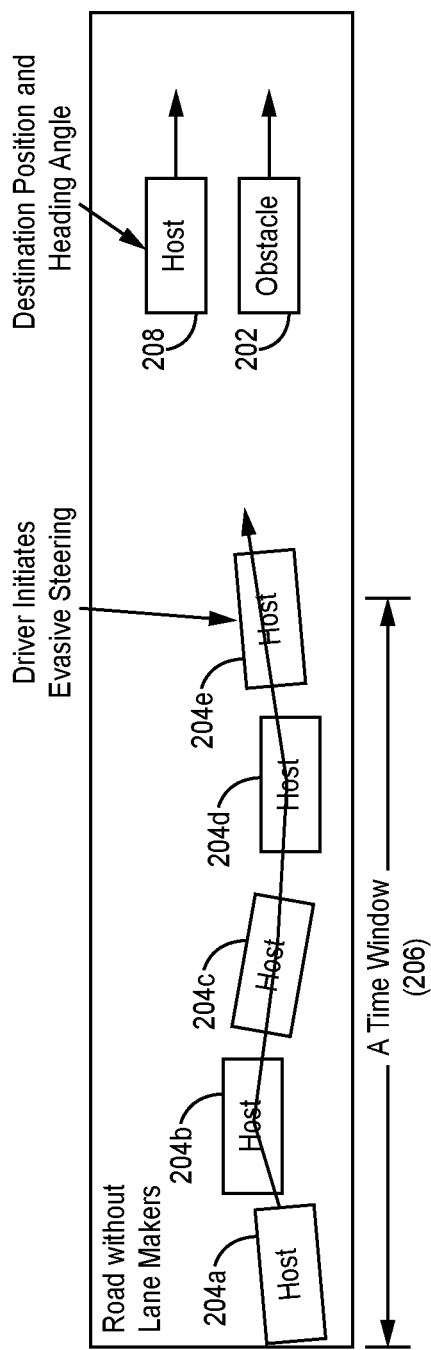
FIG. 2 is a block diagram illustrating visually utilization of yaw rate over a length of time to determine orientation of the host vehicle according to some embodiments.

FIG. 2 is a block diagram illustrating visually the utilization of yaw rate over a length of time to determine orientation of the host vehicle 200 to aid in evading an obstacle 202 according to some embodiments. In the block diagram shown in FIG. 2, the yaw rate of host vehicle 200 is measured at a plurality of instances over a time period. For example, in the embodiment shown in FIG. 2 the yaw rate of the host vehicle is calculated at a five discrete instances 204a, 204b, 204c, 204d, and 204e within time window 206. In other embodiments, any number of yaw rate calculations may be made within a given time window. In some embodiments, a destination position and destination heading angle is determined by the ESA system 100 (indicated by host position 208 located safely alongside the obstacle 202). As described in more detail below, without lane markers, the yaw rate stored in the yaw rate queue 106 is utilized to calculate the destination position and destination heading angle and the current position and current heading angle.

Figure 3:
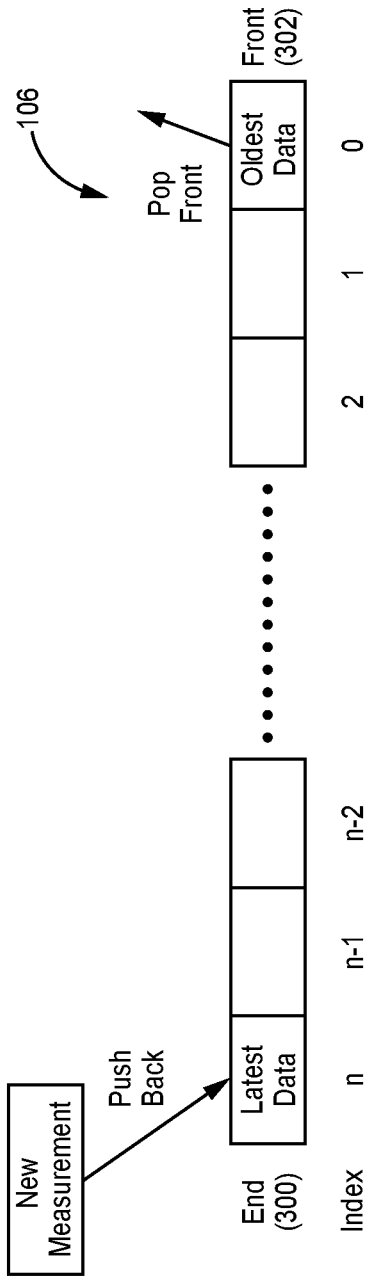
FIG. 3 is a block diagram of a queue utilized to store yaw rates according to some embodiments.

In some embodiments, the yaw rate queue 106 is a fixed length queue corresponding with the time window 206 (e.g., 3 seconds, 4 seconds). For example, FIG. 3 is a block diagram illustrating visually a fixed length yaw rate queue 106, wherein most recent measurements are added to the end 300 of the queue 106 (position n) and oldest measurements are discarded from of the front 302 of the queue 106 (position 0). Each entry in the queue stores the yaw rate of the host vehicle 200 at a particular instant in time, wherein yaw rate can be defined as the rate of change of the heading angle or rotation about the z-axis (perpendicular to the ground) of the host vehicle 200.

Figure 4:
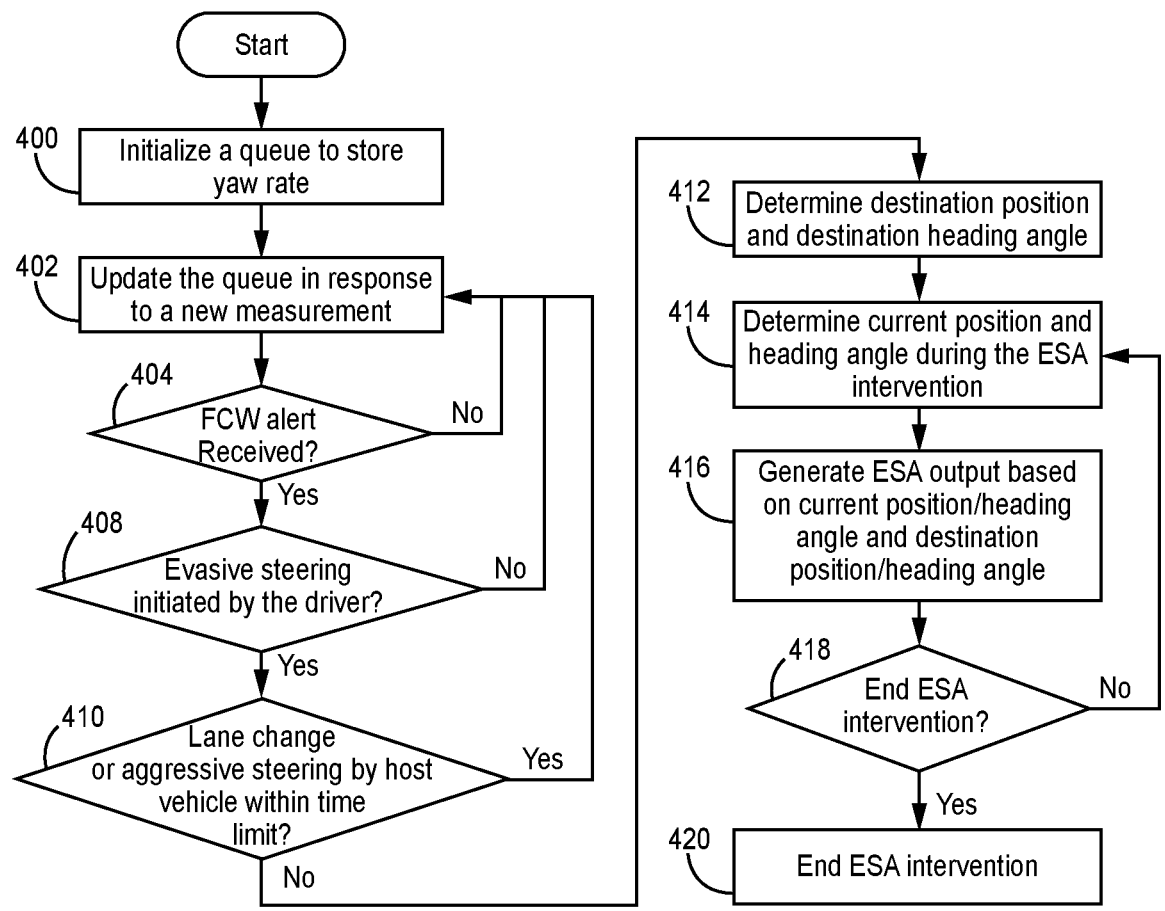
FIG. 4 is a flowchart illustrating steps implemented by the ESA system according to some embodiments.

FIG. 4 is a flowchart illustrating steps implemented by the ESA system according to some embodiments. At step 400, the yaw rate queue 106 is initialized to begin storing yaw rate data. At step 402, the yaw rate queue 106 is updated to store received yaw rate data. At step 404, a determination is made whether a front collision warning (FCW) has been received. As shown in FIG. 1, evasive steering controller 101 may receive a FCW input 110. In some embodiments the FCW input 110 indicates whether a front collision is imminent. In other embodiments, the FCW input 110 may include raw data analyzed by the evasive steering controller 101 to determine whether a front collision is imminent. In the event that a FCW has been received, then the process continues to step 408 to determine whether the driver has initiated evasive steering. If at step 404 it is determined that no FCW has been received then the process continues at step 402 updating the yaw rate queue 106.

At step 408 a determination is made whether the driver has initiated evasive steering. As shown in FIG. 1, evasive steering controller 101 may receive a steering input 108 that either identifies the presence of an evasive steering maneuver or provides inputs (e.g., steering angular rate, steering torque, lateral acceleration, lateral jerk) that are utilized to determine the presence of an evasive steering maneuver. For example, evasive steering controller 101 may compare one or more of the inputs to thresholds to determine whether an evasive steering maneuver has been initiated. If the driver has not initiated evasive steering, then no evasive steering assist (ESA) is initiated starting with step 410 and the process continues at step 402 with updating the yaw rate queue 106. If the driver has initiated evasive steering at step 408, then ESA is initiated starting at step 410. In some embodiments, initiation of ESA begins with a determination at step 410 whether the host vehicle has made a lane change or aggressive steering within a defined period of time (e.g., past several seconds). In some embodiments, the defined period of time corresponds with the length of the yaw rate queue 106 (i.e., time window defined in FIG. 2). In some embodiments, the data stored in the yaw rate queue is utilized to determine whether a lane change or aggressive steering has been initiated within the defined period of time, and therefore the length of the yaw rate queue may determine the period of time that may be reviewed for a lane change or aggressive steering event. In other embodiments, the defined period of time may be separate from the yaw rate queue, and other criteria or inputs may be utilized to detect a lane change or aggressive steering event. If the host has made a lane change or aggressive steering maneuver then no ESA is initiated and the process continues at step 402 with updating of the yaw rate queue 106. If at step 410 it is determined that the host has NOT made a lane change and/or initiated an aggressive steering event then the ESA process continues at step 412. In some embodiments, a lane change and/or aggressive steering event occurring within a time frame (e.g., last four seconds) decreases the accuracy of heading angle estimates performed at step 412, and therefore prevents utilization of ESA initiation at steps 412-418. However, assuming that the host vehicle has not conducted any lane changes and/or aggressive steering events within the time frame, then ESA may be initiated at step 412.

The order in which steps 404, 408, and 410 may be modified in other embodiments. For example, in some embodiments the determination of whether the driver has initiated evasive steering at step 408 may occur before or after the determination of whether a FCW alert has been received at step 404. In some embodiments, the least costly step (i.e., lowest computational step) may be performed first in order to determine whether any subsequent analysis is required. In other embodiments, each step is performed approximately simultaneously, wherein the decision of whether to initiate evasive steering assist (ESA) depending on the outcome of the simultaneous analysis. In still other embodiments, only a subset of steps 404, 408, and 410 is required to determine whether to initiate ESA. For example, in some embodiments, initiation of ESA may depend only on whether a FCW alert was detected at step 404 or be based only on whether the drive has initiated evasive steering at step 408.

At step 412, the destination position and destination heading angle are determined. With respect to FIG. 2, the destination position and destination heading angle represent the desired position of the host vehicle at the end of the evasive steering maneuver, presumably located safely adjacent to the obstacle that caused the evasive steering maneuver (as shown by host position 208 in FIG. 2). In the presence of lane markers, the lane markers may be utilized in combination with the detected position of the obstacle to determine a desired position and desired heading angle. Without the presence of lane markers, the yaw rate data stored by the yaw rate queue 106 may be utilized to calculate a desired position and desired heading angle. In some embodiments, heading angles are determined for each time step n stored in the yaw rate queue with the heading angle at the oldest time step (i.e., front of the queue) assigned a heading of zero. The heading angle at each time step associated with a stored yaw rate can be calculated by integrating the previous yaw rates. In this way, the current heading angle of the host vehicle can be determined at the current time step (i.e., at initiation of the evasive steering action). Likewise, the heading angles determined at each time step can be utilized to estimate the destination heading angle. In some embodiments, the destination heading angle is calculated as the average of the heading angles determined at each time step, wherein the assumption is that the general orientation of the host vehicle measured over a length of time is the best estimate of the desired orientation or heading of the car following the evasive steering maneuver. Likewise, the current position of the host vehicle (at the onset of the evasive steering maneuver) may be assigned a value of zero. The destination point of the host vehicle may be assigned a value based on the current position of the host vehicle and a defined safety offset value (e.g., 3 meters).

At step 414, the current position and heading angle are determined based on yaw rates stored to the yaw rate queue 106. In some embodiments, the current position is calculated based on the previous position, the previous heading angle, and velocity of the host vehicle. The current heading angle is calculated based on the previous heading angle and the most recent yaw rate stored to the yaw rate queue 106. In some embodiments, the yaw rate queue 106 is continually updated during the evasive steering maneuver, and thus updates to the yaw rate queue 106 may continue at the regular timing interval or frequency. In some embodiments, the determination of the destination position and destination heading angle at step 412 and the determination of the current position and heading angle at step 414 are performed approximately simultaneously. In some embodiments, the current position and heading angle is continually re-calculated at step 414, while the destination position and destination heading angle is calculated only once at step 412.

At step 416, an ESA output is generated based on the current position and heading angle determined at step 414 and desired position and heading angle calculated at step 412. In some embodiments, a proportional-integral-derivative (PID) control scheme may be utilized to minimize errors between the current position/heading angle and destination position/heading angle. In other embodiments, other type of control schemes may be utilized to generate the ESA output in order to minimize the difference between the current position and heading angle of the vehicle and the destination position and heading angle (i.e., to direct the car to the desired destination position and destination heading). As described above, the ESA output overlays additional steering torque on top of the driver applied steering torque, thus aiding the host vehicle in performing the evasive maneuver. In some embodiments, the ESA output is provided to the steering system, wherein the ESA output calculated at step 416 determines the direction and magnitude of the additional steering torque overlaid on top of the driver applied steering torque.

At step 418, a determination is made whether to end the ESA intervention. If at step 418 a determination is made to continue the ESA intervention then the ESA intervention continues by re-calculating the current position and heading angle at step 414 and generating a new ESA output at step 416. If at step 418 a determination is made to end the ESA intervention then the process ends at step 420. No additional ESA outputs are generated and following the end of a particular ESA intervention the process would re-start at step 400.

In some embodiments, the ESA intervention is limited to a particular length of time. In this embodiment, the determination at step 418 is whether the ESA time period has expired. For example, in some embodiments an ESA timer is started in response to the initiation of ESA and the ESA timer is compared to a threshold value (e.g., 1-3 seconds) at step 418 to determine whether to end the ESA intervention. If the ESA intervention time limit has not been reached, then the process continues by re-calculating the current position/heading angle at step 414 and controlling the ESA output generated at step 416. In other embodiments, the determination of whether to end the ESA intervention is based on whether the current position and heading angle is approximately equal to the destination position and destination heading angle. That is, once the vehicle reaches the destination position and destination heading angle, no additional ESA intervention is required. In some embodiments, a combination of methods may be utilized at step 418. For example, the process may end in response to either the vehicle reaching the destination position and heading angle or in response to the timer expiring. In this way, the ESA intervention is limited to a length of time no longer than the ESA timer, but may be terminated more quickly in response to the vehicle reaching the desired destination position and heading angle.

Figure 5:
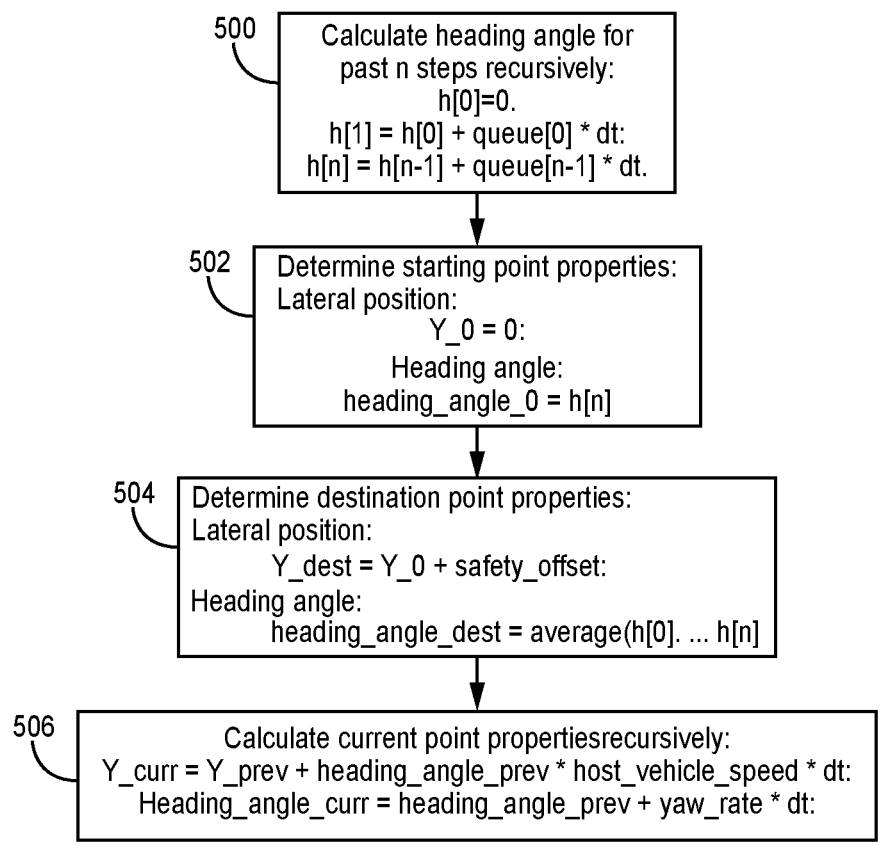
FIG. 5 is a flowchart illustrating steps implemented by the ESA system to determine the destination position and destination heading angle of the host vehicle and to calculate the current position and heading angle of the host vehicle according to some embodiments.

FIG. 5 is a flowchart illustrating steps implemented by the ESA system to determine the destination position and destination heading angle of the host vehicle and to calculate the current position and heading angle of the host vehicle according to some embodiments. Steps 500, 502 and 504 are utilized to determine the destination position and destination heading angle according to some embodiments. Step 506 illustrates calculation of current point and current heading angle according to some embodiments.

In particular, at step 500 the heading angle for the past n steps are calculated recursively. For example, the heading angle at the earliest timestep (i.e., time zero) is set equal to zero ($h(0)=0$). The heading angle at the next time step (i.e., time n=1) is calculated based on the previous heading angle (in this case, $h(0)=0$) and the integral of the yaw rate stored with respect to the host vehicle at time step zero. For example, as shown in step 500, at t=1, the heading angle is calculated as $h(1)=h(0)+yaw\_rate\_queue(0)*dt$. This calculation is performed iteratively for each time step. Thus, for time step n, the heading angle is calculated as $h(n)=h(n-1)+yaw\_rate\_queue(n-1)*dt$.

At step 502, the starting point position and starting heading angle (corresponding with the current time step or position of the host vehicle) are determined at the onset of the evasive steering maneuver. The starting point position (in the y direction) is initialized to zero with respect to the starting point position (e.g., Y_0=0). Likewise, the starting heading angle is initialized to the heading angle calculated at the current time step (e.g. heading_angle_start=h(n)), wherein the value of h(n) is calculated as described at step 500.

At step 504, the destination point position and destination heading angle is determined. The destination point position is calculated based on the starting point position and some offset (e.g., safety offset) that corresponds with a safe distance from the detected obstacle. For example, in some embodiments the destination point position is calculated as Y_dest=Y_0+safety_offset. In addition, the destination heading angle is calculated based on an average of the heading angles calculated leading up to initiation of the evasive maneuver. For example, in some embodiments the destination heading angle is calculated as heading_angle_dest=average(h(0), . . . , h(n)). Thus, the destination heading angle (i.e., the desired heading angle at the end of the evasive maneuver) is calculated to be approximately equal to the average heading angle of the host vehicle in the seconds leading up to the initiation of the evasive maneuver, which assumes that whatever heading angle the host vehicle was on prior to the initiation of ESA (represented by the average of measured heading angles), the same heading should be provided at the end of the evasive maneuver.

At step 506, the current position and current heading angle are calculated for the host vehicle. In some embodiments the current position and current heading angles are calculated recursively. For example, the current position may be calculated as Y_curr=Y_prev+heading_angle_prev*host_vehicle_speed*dt. That is, for each time step the heading angle of the previous time step and the velocity of the host vehicle are utilized to calculate the position of the host vehicle in the y direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of providing evasive steering assist (ESA), the method including:
   measuring current yaw rate data related to a host vehicle using an inertial measurement unit;
   storing the yaw rate data related to a host vehicle, wherein yaw rate data includes a yaw rate stored at a plurality of each-time steps from an initial time step [0] to a current time step [n];
   determining whether to initiate ESA;
   in response to a determination to initiate ESA, calculating a current position, a current heading angle, a destination position, and a destination heading angle, wherein the stored yaw rate data is utilized to determine the current heading angle and the destination heading angle, wherein the current heading angle is the heading angle at time step [n]; and
   generating an evasive steering assist (ESA) output based on the current position, the current heading angle, the destination position, and the destination heading angle.

2. The method of claim 1, wherein determining whether to initiate ESA includes determining whether a front collision is imminent, wherein ESA is initiated in response to a determination that a front collision is imminent.

3. The method of claim 1, wherein determining whether to initiate ESA includes determining whether a driver of the host vehicle has initiated evasive steering, wherein ESA is initiated in response to a determination that the driver has initiated evasive steering.

4. The method of claim 1, wherein determining whether to initiate ESA includes determining whether a driver of the host vehicle has completed an aggressive steering maneuver within a given time period, wherein ESA is initiated in response to a determination that the driver has not completed an aggressive steering maneuver within the given period of time.

5. The method of claim 1, wherein calculating the current heading angle includes:
   recursively calculating the heading angle of the vehicle based on the stored yaw rate data, wherein the heading angle at the initial time step [0] is assigned an initial heading angle and subsequent heading angles are calculated based on an integral of the stored yaw rate at each time step, wherein the heading angle at the current time step n is assigned as the current heading angle.

6. The method of claim 5, wherein the destination heading angle is calculated as an average of a plurality of heading angles calculated at each time step within a given time period.

7. The method of claim 6, wherein the destination position is calculated as a sum of the current position of the vehicle and a safety offset value, wherein the position of the vehicle represents a lateral position of the vehicle.

8. The method of claim 7, wherein the current position of the vehicle is updated at each time step based on a previous position of the vehicle, a previous heading angle of the vehicle, and a speed of the vehicle.

9. The method of claim 8, wherein the current heading angle of the vehicle is updated at each time based on a previous heading angle and measured yaw rate at a current time step.

10. The method of claim 1, further including:
    ending the ESA in response to an ESA timer expiring, wherein the ESA time is started at the initiation of the ESA.

11. The method of claim 1, further including:
    ending the ESA in response to the current position and the current heading angle being equal to the destination position and the destination heading angle.

12. The method of claim 1, wherein the (ESA) output is generated to minimize differences between the current position and the destination position and to minimize differences between the current heading angle and the destination heading angle.

13. A system for providing evasive steering assist (ESA) to a host vehicle, the system comprising:
    a first input for receiving yaw rate data measured by an inertial measurement unit;
    an evasive steering controller configured to store yaw rate data over a period of time from an initial time step [0] to a current time step [n], to initiate ESA based on one or more inputs, wherein in response to a determination to initiate ESA the evasive steering controller utilizes the stored yaw rate data to determine a current position and a current heading angle of the host vehicle wherein the current heading angle is the heading angle at time step [n], utilizes the stored yaw rate data to determine a destination heading angle, and utilizes the current position to determine a destination position, wherein based on the current position, the current heading angle, the destination position, and the destination heading angle the evasive steering controller generates an evasive steering assist (ESA) output; and an output for communicating the ESA output.

14. The system of claim 13, further including:

one or more inputs for receiving one or both of forward collision warnings (FCW) and steering inputs, wherein the evasive steering controller determines whether to initiate ESA in response to one or both of the FCWs and steering inputs.

15. The system of claim 14, wherein the evasive steering controller initiates ESA in response to a received FCW and a steering input indicating that a driver of the host vehicle has initiated evasive steering.

16. The system of claim 14, wherein the evasive steering controller recursively calculates the heading angle of the vehicle based on the stored yaw rate data, wherein the heading angle at an initial time step [0] is assigned an initial heading angle and subsequent heading angles are calculated based on an integral of the stored yaw rate at each time step, wherein the heading angle at a current time step n is assigned as the current heading angle.

17. The system of claim 16, wherein the destination heading angle is calculated as an average of a plurality of heading angles calculated at each time step within a given time period.

18. The system of claim 17, wherein the destination position is calculated as a sum of the current position of the vehicle and a safety offset value, wherein the position of the vehicle represents a lateral position of the vehicle.

19. The system of claim 13, wherein the evasive steering controller generates the ESA output to minimize a difference between the current position, current position heading angle and the destination position and destination heading angle.

20. The system of claim 13, wherein the evasive steering controller ends the ESA in response to an ESA timer reaching a threshold value.

* * * * *

UNITED STATES PATENT AND TRADEMARK OFFICE
CERTIFICATE OF CORRECTION

PATENT NO. : 12,091,084 B2  
APPLICATION NO. : 17/730598  
DATED : September 17, 2024  
INVENTOR(S) : Guoguang Zhang, Tanto Sugiarto and Walter K. Kosiak Page 1 of 1

It is certified that error appears in the above-identified patent and that said Letters Patent is hereby corrected as shown below:

In the Claims

Column 7, Line 58, Claim 1 "of each-time steps" should read --of time steps--

Signed and Sealed this  
Twenty-first Day of January, 2025

Coke Morgan Stewart  
*Acting Director of the United States Patent and Trademark Office*